United States Patent [19]

Kaspar

[11] 4,145,844
[45] Mar. 27, 1979

[54] REFRIGERATOR DOOR CONSTRUCTION

[75] Inventor: Melvin C. Kaspar, La Grange Park, Ill.

[73] Assignee: Ardco, Inc., Chicago, Ill.

[21] Appl. No.: 861,272

[22] Filed: Dec. 16, 1977

[51] Int. Cl.$^2$ .............................................. E05F 1/12
[52] U.S. Cl. ........................................ 49/386; 49/501; 403/401; 403/231
[58] Field of Search ............... 49/386, 70, 478, 501, 49/504; 403/401, 402, 231; 160/381

[56] References Cited

U.S. PATENT DOCUMENTS

| | | | |
|---|---|---|---|
| 1,672,419 | 6/1928 | Lehman | 403/401 |
| 2,004,727 | 6/1935 | Keller | 160/381 UX |
| 3,365,747 | 1/1968 | Barroero | 49/386 X |
| 3,499,245 | 3/1970 | Winsler et al. | 49/504 X |
| 3,507,074 | 4/1970 | Gallegos | 49/386 |
| 3,629,972 | 12/1971 | Rehberg et al. | 49/386 X |
| 3,673,735 | 7/1972 | Winsler et al. | 49/501 |

Primary Examiner—Philip C. Kannan
Attorney, Agent, or Firm—Dressler, Goldsmith, Clement, Gordon & Shore, Ltd.

[57] ABSTRACT

A rectangular glass panel refrigerator door is provided with a mitered frame construction. The door frame has two vertical side frame members and two horizontal cross frame members. Each frame member is generally channel-shaped and has a front wall, an inner sidewall and an outer sidewall which together form a substantially U-shaped channel. The end of each frame member is angled at 45 degrees to form a miter joint with another frame member perpendicular thereto. A right angle corner brace is provided at each miter joint and has one leg lying along the inner wall of the horizontal cross frame member and another leg lying along the inner wall of the vertical frame member. Projecting outwardly from the inner wall of the vertical side frame member is a lug having a threaded aperture therein. A screw is disposed within the outer wall of the horizontal cross frame member with the screw head bearing against the outer wall and with the screw shank extending between the sidewalls of the vertical side frame member and threadingly engaged in the threaded aperture of the lug extending from the inner sidewall of the vertical side frame member. A nut is threadingly engaged on the screw shank and bears against the first leg of the corner member so that the two frame members forming a mijoint are maintained in the miter joint configuration and are prevented from moving relative to one another. A torsion bar hinge assembly is provided with the torsion bar held against rotation at one point in the vertical side frame member by a set screw.

3 Claims, 7 Drawing Figures

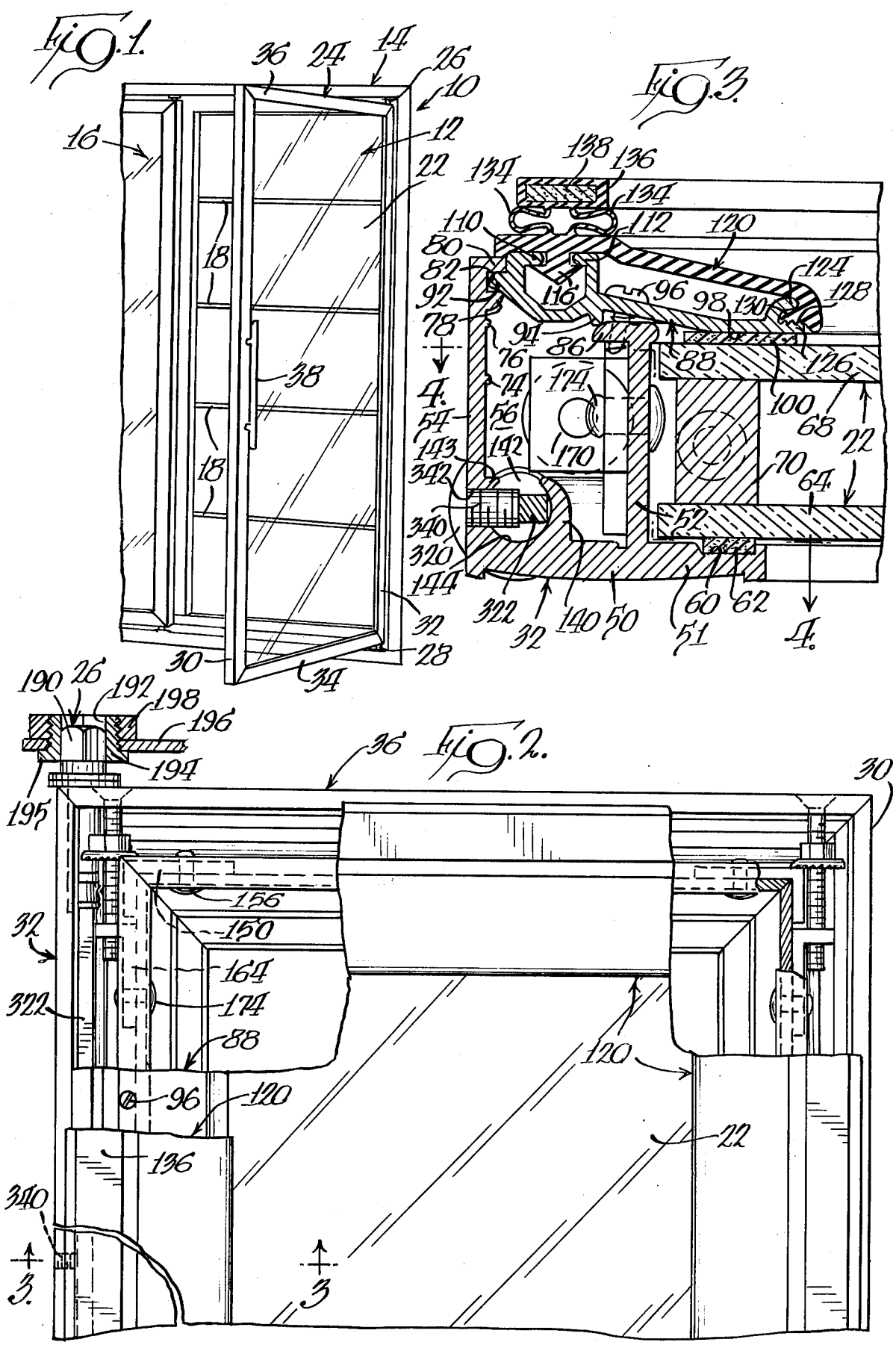

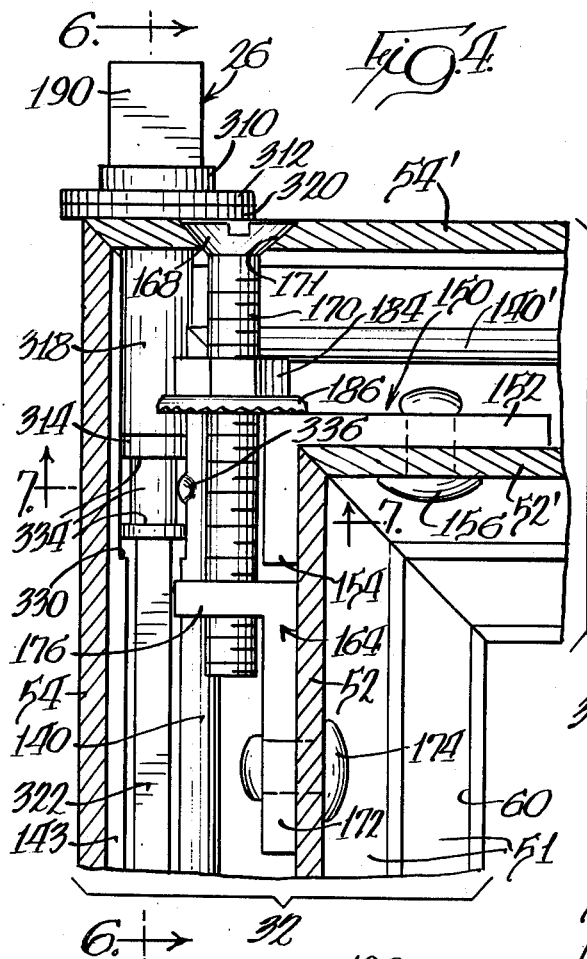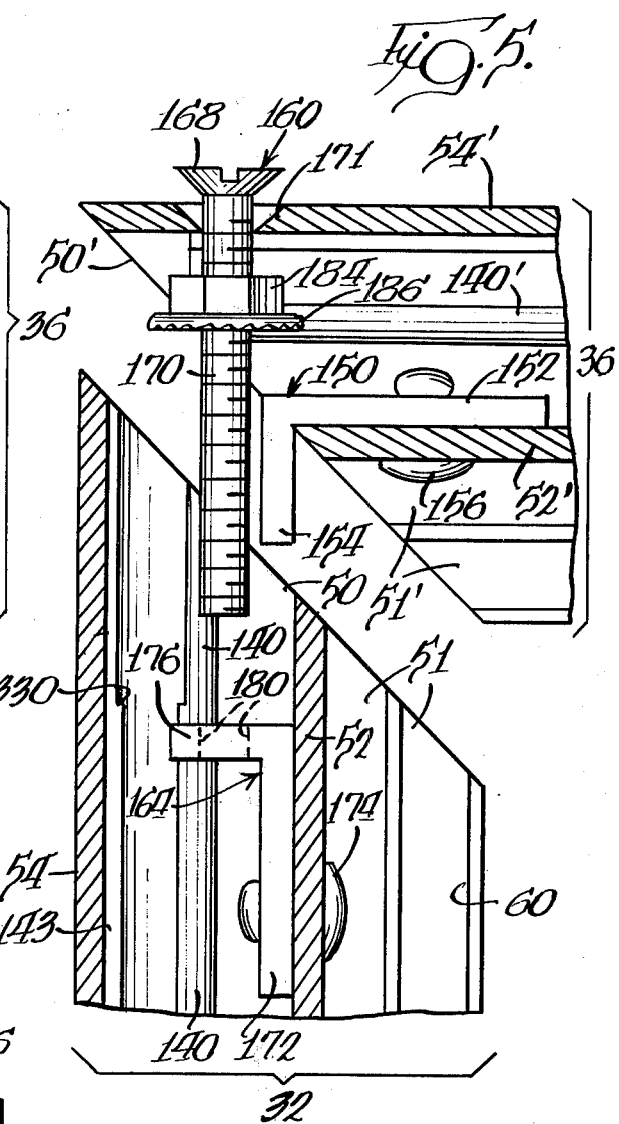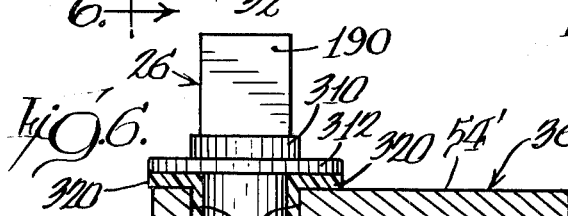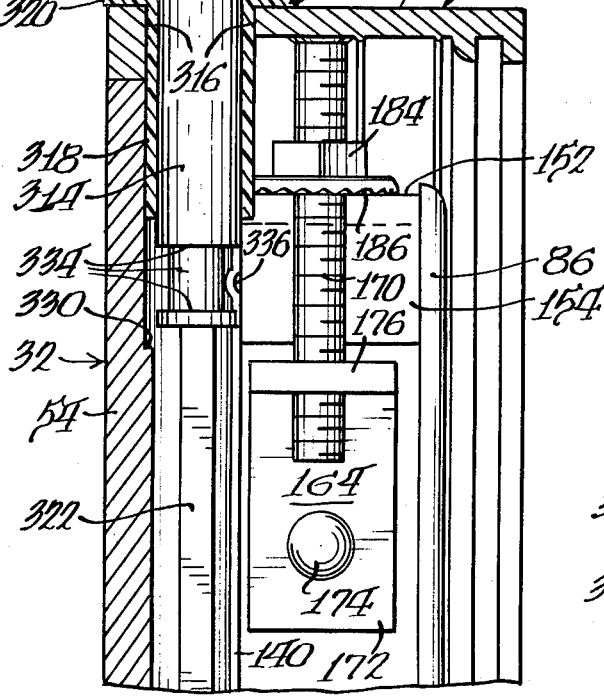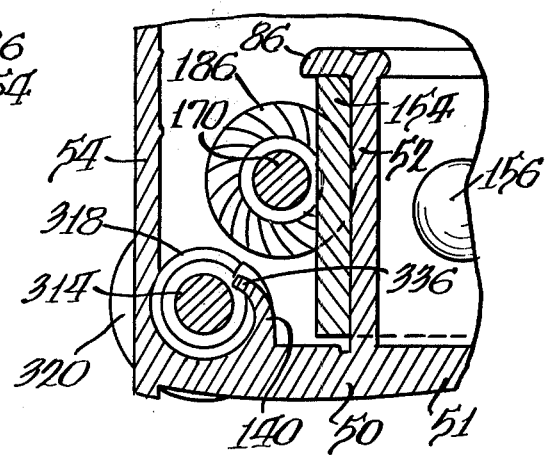

REFRIGERATOR DOOR CONSTRUCTION

BACKGROUND OF THE INVENTION

This invention relates to commercial refrigerator doors of the channel type disclosed in the U.S. Pat. Nos. 3,499,245; 3,629,972; 3,673,735; and 3,697,723. These doors are found on large commercial coolers or freezers which are commonly used in retail grocery or beverage stores to hold and display goods for selection by shoppers.

Commercial refrigerator or freezer doors of this type generally utilize glass panels mounted in metal frame members with appropriate sealing or gasket materials. The doors themselves are swingably secured to a refrigerator, freezer or cooler cabinet frame and have appropriate sealing members adapted for contacting and sealing against the frame when the door is closed.

Refrigerator doors of the type to which this invention pertains must have good insulating properties to prevent undue inleakage of heat through the door when the door is closed. Consequently, it would be desirable to provide a door frame construction which, though made of separate frame members, will maintain the separate frame members in a tight and rigid relationship wherein convective air inleakage is substantially eliminated.

A refrigerator door of the type to which this invention pertains has a glass panel mounted within the frame members to provide a large line of sight so that the customer can easily select merchandise by looking through the glass panel of the door before opening the door. Consequently, it would be desirable to provide a refrigerator door frame construction wherein the frame members, while providing as large a glass area as possible, are also rigidly and tightly held or secured to each other around the glass panel so that the glass panel is properly and securely held therein and so that convective air inleakage around the glass panel through the door is substantially reduced.

From the standpoint of manufacturing and/or maintenance and repair, it would also be desirable to provide a refrigerator door wherein the frame members could be connected together with a single screw in each corner of the door, which screw would be readily accessible to allow quick removal.

The type of door to which this invention pertains can include a torsion bar hinge system which biases the door to the normally closed position. It would be desirable to provide a means for maintaining the torsion pin hinge within the door frame assembly that does not require the use of many separate screws or other fastening devices.

SUMMARY OF THE INVENTION

A generally rectangular refrigerator door is provided which has four generally channel-shaped frame members on the periphery of a glass panel. The frame members are arranged in a rectangle with two, parallel vertical side members and with two, parallel horizontal cross members joining the side members at each end. Each channel-shaped frame member has a front wall, from which project an inner sidewall and an outer sidewall. The frame members are arranged into a rectangular framework with the front wall of each frame member parallel to the plane of the door, and hence parallel to the plane of the glass panel held within the framework.

The frame members are connected at each corner by a miter joint. Specifically, each frame member has an abutting surface angled at substantially 45 degrees with respect to the length of each member. Thus, the abutting end surfaces of two frame members can be brought into contact to form a miter joint with a 90 degree corner.

A novel means is used to hold two frame members together at each corner. A right angle corner member having a first leg and a second leg perpendicular to the first leg is provided at each corner with the first leg secured to the inner wall of one of the frame members, say the horizontal cross frame member, and with the second leg disposed adjacent the inner wall of the other frame member, say the vertical side frame member, thereby preventing outward movement of the vertical side frame member away from the first cross frame member. Extending outwardly from the inner wall of the vertical side frame member towards the outer wall of the vertical side frame member is a lug having a threaded aperture. A screw is disposed through an appropriate receiving hole in the outer sidewall of the horizontal cross frame member with the screw head bearing against the outer sidewall with the screw shank extending between the inner and outer sidewalls of the vertical side frame member. The screw shank is threadingly engaged in the threaded aperture of the lug extending from the inner sidewall of the vertical side frame member thereby securing the two frame members together. A lock nut is threadingly engaged with the screw shank and bears against the first leg of the corner member so that the screw is locked against rotation and so that horizontal cross frame member and the vertical side frame member are maintained in mitered joint configuration and are prevented from moving relative to one another.

The door is mounted in a door frame for swinging between an open and closed position on upper and lower hinge members. The upper hinge member has a non-circular element projecting from the outer sidewall of the horizontal cross frame member and is adapted to be received in a suitable receiving aperture in the refrigerator door mounting frame. The hinge member further has a cylindrical element projecting inwardly from the outer sidewall of the horizontal cross frame member and into the channel of the vertical side frame member which is specially adapted to receive cylindrical element. Specifically, the vertical side frame member has an intermediate wall between the outer sidewall and the inner sidewall which defines a secondary channel between the outer sidewall and the intermediate wall. The cylindrical portion of the hinge is disposed within the secondary channel.

A novel structure is provided for preventing the hinge member from being removed or from falling out of the door before installation of the door. The inwardly projecting cylindrical portion of the hinge further has an annular channel and the intermediate wall is deformed in a region adjacent the annular channel so that the deformation projects therein to prevent displacement of the hinge member relative to the door while at the same time allowing rotation of the hinge member.

The door, when mounted in the refrigerator frame, closes automatically by a torsion bar spring. A torsion bar of noncircular cross section extends from the cylindrical portion of the hinge member within the secondary channel. A set screw is threadingly engaged in the outer wall of the vertical side frame member and projects into the secondary channel to force the torsion bar against a portion of the intermediate wall and prevent rotation of the torsion bar at that point so that the door is urged in a closing direction by the torsion in the torsion bar.

Numerous other advantages and features of the present invention will become readily apparent from the following detailed description of the invention and of one embodiment thereof, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a general perspective view of a refrigerator door assembly to be described as an illustrative embodiment of the present invention;

FIG. 2 is an enlarged partial, fragmentary, vertical cross-sectional view taken through the door illustrated in FIG. 1;

FIG. 3 is an even more enlarged fragmentary, horizontal cross-sectional view taken generally along the plane 3—3 of FIG. 2;

FIG. 4 is a fragmentary, cross-sectional view taken generally along the broken planes 4—4 of FIG. 3;

FIG. 5 is a view similar to FIG. 4 but showing the door frame members displaced from one another at the joint region prior to assembly of the joint;

FIG. 6 is a cross-sectional view taken generally along the plane 6—6 of FIG. 4; and FIG. 7 is a cross-sectional view taken generally along the plane 7—7 of FIG. 4.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated, since the invention is described with only reference to an embodiment which is simple and straightforward.

For ease of description, the apparatus of this invention will be described in the normal use position, and terms such as upper, lower, horizontal, etc., will be used with reference to this normal operating position. It will be understood, however, that apparatus of this invention may be manufactured, stored, transported and sold in orientation other than the normal operation position described.

FIG. 1 illustrates a refrigerator door assembly 10 in which an open door 12, having a novel construction in accordance with the present invention, is mounted in a door mounting frame 14 of a refrigerated display case or cabinet such as those typically used in supermarkets and from which purchasers may select refrigerated beverages, foods, and other products. In commercial practice, the door assemblies may be supplied with any number of desired doors mounted in the single frame 14, such doors being adapted for opening in the same direction or arranged in pairs for opening in opposite directions. In FIG. 1, another door 16 which is identical to the door 12, is shown mounted in a closed position in frame 14 adjacent the open door 12. Within the refrigerator or cooler are a plurality of shelves 18 mounted behind the doors 12 and 16 to support merchandise of various kinds.

The door 12 comprises a transparent panel 22 which may consist of a number of spaced apart, parallel panes of glass, all mounted in a frame 24, which is preferably made of aluminum or some other suitable material. The door frame 24 is swingably mounted in the door mounting frame or casing 14 by means of suitable upper and lower hinges 26 and 28, respectively, to allow the door 12 to swing between the open position illustrated and a closed position (illustrated for the adjacent door 16).

The door frame 24 comprises four rectangularly related frame members: first and second parallel, vertical, side frame members 30 and 32, respectively, and first and second parallel, horizontal, cross frame members 34 and 36, respectively, which are perpendicular to the vertical side frame members. In particular, for the door 12 illustrated in FIG. 1, the side frame member 30 is the outer vertical frame member of the door forming the outer vertical periphery of the door, the side frame 32 is an inner vertical frame member forming the inner vertical periphery of the door, the cross frame member 34 is a lower horizontal frame member defining the door bottom, and the cross frame member 36 is the upper horizontal frame member defining the top of the door. A suitable handle 38 may be mounted on outer vertical side frame member 30 for use in opening and closing the door.

Since the door must be substantially leak tight when it is closed against the door mounting frame 14, it is necessary that the door frame 24 be straight and true with respect to the mating surfaces of the door mounting frame 14. Likewise, it is necessary that the door frame 24 be rigid and unyielding and able to accommodate the impact loads and forces generated when the door is opened and closed. Further, it is necessary that the glass pane transparent panel 22 be securely held within the frame 24, in cooperation with suitable sealing gaskets (to be described in detail hereinafter), so that air cannot leak through the door between the frame 24 and the panel 22. The present invention provides a novel door frame construction wherein these requirements are met with a relatively inexpensive and novel channel member structure and miter joint construction as will be described in detail hereinafter.

Frame Member Channel Structure

FIG. 2 illustrates the top half of the door 12, as viewed from the back, (i.e., as viewed outwardly from inside the refrigerator cabinet) with portions of the door cut away to provide views of the interior parts. The upper hinge 26 member is on the left hand side of the figure and is secured to the door through the upper cross frame member 36. The inner vertical side frame member 32 is on the left hand side of the figure and the outer vertical side frame member 30 is on the right hand side of the figure.

The novel channel structure and novel joint construction, wherein each cross frame member 34 and 36 is secured to the vertical side frame members 30 and 32 will be described with reference to the upper left hand corner of the door illustrated in FIG. 2. The channel structure and joint construction is the same for all four corners of the door. It should be noted that the novel joint construction for each corner will accommodate the incorporation of a hinge assembly, such as hinge member 26, on either side of the door and at either the top or the bottom of the door. It is contemplated, however, that only one torsion hinge 26 will be used with any one door of the present invention. After the basic channel structure and joint construction of the present invention is described, the additional features relating to the torsion hinge member 26 will be described in detail.

The novel channel structure of the frame members of the present invention is clearly illustrated in detail in FIG. 3 which shows the vertical side frame member 32 having a generally channel-shaped configuration with a front wall 50, an inner sidewall 52, and an outer sidewall 54. The inner and outer sidewalls 52 and 54 project outwardly from, and generally perpendicularly to, the front wall 50 and define a primary channel 56 therebetween. The other frame members, upper cross frame member 36, lower cross frame member 34, and vertical side frame member 30, each have the same configuration. Preferably, the frame members are extruded aluminum.

The front wall 50 receives and supports a glass pane 64, comprising part of the dual pane glass panel 22. The glass panel 22 is normally of the insulated type having a plurality of spaced panes, in this case two panes 64 and 68. Spacers 70 are hermetically sealed between the edges of the panes 64 and 68, so that moisture will be excluded from the spaces between the panes. The dry air between the panes has a good insulating value.

As shown, the front wall 50 extends inwardly from the edge of the door to form an extension 51 adjacent the glass pane 64 and has a channel 60 near its inner edge for receiving a gasket, such as foam tape 62, or other suitable material for sealing the region between the exterior surface of the glass pane 64 and the channel front wall extension 51.

The channel shaped frame member 32 has a number of integrally formed extruded ridges and flanges. Two ridges 74 and 76 are provided on the inside surface of the outer sidewall 54 and run the entire length of the frame member 32. Two flanges 78 and 80 are integrally formed at the distal end of the outer sidewall 54 and run the entire length of the frame member 32 to define a small channel 82 therein. On the distal end of the inner sidewall 52, there is an integral flange 86 which also runs the entire length of the frame member 32. The flanges 80, 82 and 86 cooperate, as illustrated in FIG. 3, to provide a mounting frame for an inner molding 88 which extends the length of the frame member 32 and covers over the opening to channel 56.

The inner molding 88 is provided to hold the glass panel 22 in the frame of the door and further to hold a sealing member or gasket 120 on one side of the door for sealing against the door mounting frame of the refrigerator compartment when the door is closed.

The molding 88 is shaped as shown with a lug 92 which is disposed in the channel 82 of the outer sidewall 54. The inner molding 88 also has a bottom lug 94 which bears against the top of flange 86 at the distal end of the inner sidewall 52. The inner molding 88 is held in place against the frame member 32 with a screw 96 which is threadingly engaged to a receiving aperture in the flange 86. Alternatively, the flange 86 could be considerably shorter than illustrated in FIG. 3 and a self-tapping screw could be used in place of the screw 96, which self-tapping screw could project downwardly alongside the very edge of the flange 86 and could cut threads into the edge surface of flange 86, thereby eliminating the need for a tapped hole in the flange 86.

As illustrated in FIG. 3, the molding strip 88 extends inwardly past the inner sidewall 52 and presents a generally flat bearing surface 98 facing towards the inner pane 68 of the glass panel 22. Bearing surface 98 is adapted to contact a suitable gasket, such as foam tape 100, and to urge the gasket tight against the pane 68.

The illustrated molding strip 88 has a pair of outer gasket retaining flanges 110 and 112, adapted to clamp an insert prong 116 of the door closure sealing gasket 120. The gasket prong 116 has a longitudinal cross-section in the shape of an arrowhead and is resiliently compressible so that the prong can be forced into the narrow opening between the flanges 110 and 112 and past the flanges 110 and 112 whereupon the prong 116 expands into a gripping relationship therewith.

The inner edge of the molding 88 has two legs 124 and 126 which run longitudinally the length of the molding and receive a tab portion 130 of the door closure sealing gasket 120 therebetween. Preferably, the leg 126 has a plurality of longitudinally extending teeth 128 for positively gripping the tab 130 of the gasket 120.

The gasket 120 has, on the side facing away from the rear of the door, a pair of flexible pleats or folds 134 which are formed integrally therewith and are adapted to extend outwardly to a tubular outer portion 136, within which magnets 138 are mounted. The magnets, in conjunction with the door closure sealing gasket 120, hold the door shut when it is in the closed position and provide firm sealing pressure between the gasket 120 and the refrigerator frame 14. The gasket 120 is of the type that is well known to those skilled in the art and no further details will be given regarding its construction, materials, or operation.

Formed integrally with the channel-shaped frame member 32 is an intermediate wall 140 which projects upwardly from the front wall 50 of the member into the primary channel 56 between the inner sidewall 52 and the outer sidewall 54 for defining a secondary channel 142 between the intermediate wall 140 and the outer sidewall 54. This intermediate wall 140 has a concave surface facing the outer sidewall 54. Further, the outer sidewall 54 has a small projecting wall 143 which has a concave surface merging with the front wall 50 and which, together with intermediate wall 140, forms a partially cylindrical interior surface 144 defining the channel 142. The cylindrical interior surface 144 of the channel 142 cooperates with certain elements of the hinge 26 (illustrated in FIG. 2) as will be explained in detail hereinafter.

The space in the primary channel 56 between the sidewalls 52 and 54 above the intermediate wall 140 can be used to contain electrical cable, wires, and/or heating elements (not illustrated) which are well known in the art and which are commonly used in this type of refrigerator door.

All of the four frame members of door 12 (frame members 30, 32, 34, and 36) each have the same basic channel structure and molding configuration as described above for frame member 32.

Miter Joint

According to the present invention, a novel miter joint is provided for rigidly securing the frame members together at each of the four corners of the door in a manner which allows easy assembly and disassembly of the door and in a manner which provides a rigid joint substantially free of air leakage paths. The joint is most clearly illustrated in FIGS. 4 through 7. These figures are enlarged views of the left-hand corner of the door illustrated in FIG. 2.

FIG. 4 illustrates the top horizontal cross frame member 36 in a tight, miter connection with the vertical side frame member 32. Each frame member terminates at each of its ends at an angle of 45° with respect to the length of each member. This is most clearly shown in FIG. 5 wherein the joint is shown in a disassembled configuration and wherein the hinge assembly 26 has been removed. Specifically, the vertical side frame member 32 is shown with an angled end comprising the individual cross-sectional end surfaces of the outer sidewall 54, of the front wall 50, of the inner sidewall 52 and of the front wall extension 51. The cross-sectional surfaces of each of these structural portions of the side frame member 32 are perpendicular to the plane of the door (and hence perpendicular to the plane of FIG. 5).

With continued reference to FIG. 5, the upper horizontal cross frame member 36 has an angled end comprising the individual cross-sectional end surfaces of the frame elements, including the end surfaces of the outer sidewall 54' of the front wall 50', of the inner sidewall 52' and of the front wall extension 51'. The cross-sectional surfaces of these elements of the upper cross frame member 36 are, like those of the vertical side member 32, generally perpendicular to the plane of the door (and hence perpendicular to the plane of FIG. 5).

Since the end of the vertical side member 32 is angled at a 45° angle with respect to the length of the member 32 and since the end of the upper cross member 36 is angled at a 45° angle with respect to the length of the member 36, the two members 32 and 36 can be placed in an end-abutting configuration in a 45° miter joint to form a 90° corner as illustrated in FIG. 4.

To connect the cross member 36 with the vertical side member 32, a novel joint fastening structure is incorporated. As illustrated in FIGS. 4 and 5, a right angle corner member 150 is provided at the distal end of upper cross member 36 and has a first leg 152 and a second leg 154 perpendicular to the first leg 152. The first leg 152 lies parallel to, and is secured to, the inner wall 52' of the upper cross frame member 36. The first leg 152 of the right angle corner member 150 is preferably secured to the inner wall 52' of the upper cross frame member 36 by a pop rivet 156. The second leg 154 of the right angle corner member 150 is disposed adjacent the inner wall 52 of the vertical side frame member 32 as best illustrated in FIG. 4. This prevents the outward movement of the vertical side frame member 32 away from the upper cross frame member 36.

It should be noted that the legs 152 and 154 of the corner member 150 preferably bear against the underside of the flange at the distal end of the inner sidewalls (such as flange 86 on sidewall 52 as illustrated in FIG. 3). This provides increased strength and rigidity in the joint.

For providing a positive, but releasable connection between the upper cross frame member 36 and the vertical side frame member 32, a screw 160 is provided within the upper cross frame member 36 and an apertured receiving lug 164 is provided on the vertical side frame member 32.

The screw 160 has a head 168 and a threaded shank 170. Near the distal end of the upper cross frame member 36, the outer sidewall 54' has a conical bearing surface 171 defining an aperture through which the screw shank 170 passes and which is adapted to matingly receive the screw head 168 in bearing engagement therewith.

The lug 164 has a first leg 172 which is secured, as by a pop rivet 174, to the inner sidewall 52 of the vertical side frame member 32 and has a second leg 176, generally perpendicular to the first leg 172, which projects outwardly from the inner wall 52. The second leg 176 defines therein a threaded aperture 180 for receiving, in threading engagement, the shank 170 of the screw 160.

To make the connection tight, the screw 160 is engaged, as illustrated in FIG. 4, so that the screw head 168 is in bearing engagement with the surface 171 whereby the upper horizontal cross frame member 36 and the vertical side member 32 are brought together along their angled end bearing surfaces to form a tight miter joint.

A nut 184, with an integral lock washer flange 186, may be provided as illustrated in FIG. 4 so that the nut can be threaded down into engagement with the upper surface of the first leg 152 of the right angle corner member 150. This adds rigidity to the joint and prevents the screw 160 from backing out of threaded engagement with the lug 164. Adjustment of the nut 184 is possible during fabrication of the door before the inner molding 88 (in FIG. 3) is installed, or, on a completed door in the field, by first removing the inner molding 88.

Door Hinge Assembly

The novel door frame construction of the present invention includes a unique hinge mounting structure as best illustrated in FIG. 4 and FIG. 6. The hinge 26 is similar, in some respects, to the hinge disclosed and described in the above-mentioned U.S. Pat. No. 3,629,927 (with reference therein to hinge elements 70, 72, 76, etc.). The hinge of the present invention has an outwardly projecting male end portion 190 which is preferably non-circular in cross-section. In the illustrated embodiment, the male end portion 190 is shown as having a substantially square cross section and is adapted to be received in a suitable female receiving aperture of identical cross section, such as aperture 192 in a refrigerator frame 14 illustrated in FIG. 2.

The refrigerator frame has a projecting hinge top mounting bracket 196 and a top hinge pin bushing 194 which has a lower flange 195 bearing against the top bracket 196. An adjusting lock nut 198 is in threaded engagement with bushing 194 and holds the bushing 194 against the top bracket 196.

At the bottom of the door the frame 14 may be provided with a hinge mounting assembly similar to the bushing 194, bracket 196 and lock nut 198 described for the upper hinge or may be provided with some other suitable holding assembly.

As shown to best advantage in FIGS. 4, 6 and 7, the hinge member 26 has a cylindrical base at 310 and an integral washer portion 312 exterior of the horizontal cross-frame member 36. Projecting into the horizontal cross frame member 36 from the base of the washer portion 312 is a generally cylindrical element 314. The cylindrical element 314 projects through an aperture 316 in the outer sidewall 54' of the upper horizontal cross-frame member 36, as best shown in FIG. 6.

A hollow, generally cylindrical nylon bearing 318 is provided between the cylindrical element 314 and the walls of aperture 316 to allow the cylindrical hinge element 314 to rotate therein with a minimum of friction. The bearing 318 has an integral top flange 320 on one end disposed beneath the hinge washer portion 312 against the outer surface of the outer sidewall 54' of the upper horizontal cross-frame member 36 to further accommodate rotation of the hinge member 26 with respect to the door frame members 32 and 36.

The hinge member 26 can be rotated and maintained in a given orientation with respect to the door 12 by means of a torsion bar 322 which extends outwardly from one end of the cylindrical hinge element 314. The torsion bar preferably has a non-circular axial cross-section, such as a square cross-section illustrated. The torsion bar 322 projects into the vertical side frame member 32 for some distance along the length of the door as illustrated in FIGS. 2 and 3. More specifically, the torsion bar 322 and cylindrical element 314 are disposed within the vertical side frame member 32 in the secondary channel 142 defined between the arcuate portion of the outer sidewall 54 and the intermediate wall 140.

As illustrated in FIGS. 3, 4 and 6, the square-shaped torsion rod 322 is substantially smaller than the secondary channel 142 and has a maximum cross-sectional dimension which is less than the diameter of the cylindrical hinge element 314. To accommodate the larger diameter of the cylindrical hinge element 314, the vertical sidewall 54, the front wall 50, and the intermediate wall 140 are undercut in the region of the cylincrical hinge element 314 to provide an enlarged region in the channel 142 having a diameter just large enough to receive the cylindrical nylon bearing 318. The undercut region of the channel 142 is best illustrated in the disassembled view of FIG. 5 wherein the undercut surfaces are spaced inwardly by the distance of the shoulder 330.

The hinge member 26 is maintained within the door frame during fabrication and prior to installation by a novel holding structure. Specifically, the cylindrical hinge element 314 has, at its distal end, an annular channel 334, as best illustrated in FIGS. 4 and 6. Adjacent the channel 334, the intermediate wall 140 is deformed into a crimp 336, which crimp 336 projects into the channel 334 to prevent the cylindrical hinge element 314 from being displaced more than a small amount in either longitudinal direction. This crimp 336 is easily formed during fabrication of the door frame after the hinge assembly 26 has been placed in the door and properly disposed within the secondary channel 142.

As most clearly shown in FIG. 3, the square-shaped torsion bar 322 is held at one point be a set screw 340 which is threadedly engaged within an aperture 342 in the outer sidewall 54 of the vertical side frame member 32. One end of the set screw 340 bears against one of the sides of the square-shaped torsion bar 322 and forces the torsion bar 322 against a portion of the intermediate wall 140 to prevent rotation of the torsion bar 322 at that point. Thus, if the torsion bar is twisted above the point where it is held by the set screw 340, as by turning the hinge end portion 190, a predetermined amount of torsion force can be set in the hinge assembly 26. This feature is used to provide the door 12 with a self-closing action as will next be explained.

With reference to FIG. 2, the non-circular end portion 190 of hinge 26 is inserted in the receiving bushing 194. The torsion force on the hinge can then be adjusted by turning the bushing 194 with a square wrench or key in the direction that the door closes. The turning of the bushing 194 turns the end portion 190 of the hinge element which, being rigidly connected through the circular hinge element 314 to the torsion bar 322, has the effect of twisting the torsion bar 322 above the point where the torsion bar is held by the set screw 340. In this way, a predetermined amount of torsion force is set in the hinge assembly.

The hinge 28 at the bottom of the door (FIG. 1) may have the same general construction as hinge 26 described above, except that hinge 28 does not need to be provided with a torsion rod (such as rod 322 for hinge 26). That is, the door can be permitted to freely rotate about hinge 28 which is held against rotation in the door mounting frame 14. All of the door closure torsion force would be furnished by the top hinge 26.

From the foregoing, it is seen that each of the four door frame members can be made from identically extruded structural channels. Depending on whether the channel is to be used as a cross member or side member, only a few holes are drilled to accommodate the screws, hinge member, and pop rivets as required. The door frame can be relatively easily assembled and the corner miter joints are rigid and strong.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

I claim:

1. A rectangular refrigerator door frame comprising: first and second parallel side frame members;

first and second parallel cross frame members perpendicular to said side frame members;

said first cross frame member connecting one end of said first side frame member to one end of said second side frame member, said second cross frame member connecting the other end of said first side frame member to the other end of said second side frame member;

at least said first side frame member and said first cross frame member each being generally channel-shaped and each having a front wall and an inner and outer sidewall projecting from said front wall, said walls together defining a primary channel therebetween, the outer sidewall of said first cross frame member defining an unthreaded aperture adjacent one end;

said first side frame member and said first cross frame member each having an end abutting surface angled at substantially 45 degrees with respect to the length of each member and forming a miter joint therebetween;

a right angle corner member having a first leg and a second leg substantially perpendicular to said first leg, said first leg secured to the inner sidewall of said first cross frame member and said second leg disposed in said primary channel of said first side frame member adjacent the inner sidewall therein whereby outward movement of said first side frame member away from said first cross frame member is prevented;

a lug extending into said primary channel of said first side frame member from the inner sidewall, said lug defining a threaded aperture in alignment with said unthreaded aperture of said first cross frame member;

a screw disposed in said unthreaded aperture of said first cross frame member with the screw head bearing against the outer sidewall and with the screw shank extending into the primary channel between the sidewalls of said first side frame member, said screw being theadingly engaged in said threaded aperture of said lug extending from said inner sidewall of said first side frame member whereby said first cross frame member and said first side frame member are maintained in a miter joint configuration and are prevented from moving relative to each other; and a nut threadingly engaging said screw shank and bearing against said first leg of said corner member to lock said screw against rotation relative to said frame members.

2. A rectangular refrigerator door frame comprising:
first and second parallel side frame members;
first and second parallel cross frame members perpendicular to said side frame members;
said first cross frame member connecting one end of said first side frame member to one end of said second side frame member, said second cross frame member connecting the other end of said first side frame member to the other end of said second side frame member;
at least said first side frame member and said first cross frame member each being generally channel-shaped and each having a front wall and an inner and outer sidewall projecting from said front wall, said walls together defining a primary channel therebetween, the outer sidewall of said first cross frame member defining an unthreaded aperture adjacent one end;
said first side frame member and said first cross frame member each having an end abutting surface angled at substantially 45 degrees with respect to the length of each member and forming a miter joint therebetween;
a right angle corner member having a first leg and a second leg substantially perpendicular to said first leg, said first leg secured to the inner sidewall of said first cross frame member and said second leg disposed in said primary channel of said first side frame member adjacent the inner sidewall therein whereby outward movement of said first side frame member away from said first cross frame member is prevented;
said inner sidewall of said first side frame member having a flange on the distal end generally parallel to said front wall and said corner member second leg bearing against said flange to provide increased joint rigidity;
a lug extending into said primary channel of said first side frame member from the inner sidewall, said lug defining a threaded aperture in alignment with said unthreaded aperture of said first cross frame member; and
a screw disposed in said unthreaded aperture of said first cross frame member with the screw head bearing against the outer sidewall and with the screw shank extending into the primary channel between the sidewalls of said first side frame member, said screw being threadingly engaged in said threaded aperture of said lug extending from said inner sidewall of said first side frame member whereby said first cross frame member and said first side frame member are maintained in a miter joint configuration and are prevented from moving relative to each other.

3. A refrigerator door construction comprising:
a door mounting frame;
a door swingable in said frame;
said door having a plurality of rectangularly related frame members, two of said frame members being parallel first and second cross frame members and two of said frame members being parallel first and second side frame members perpendicular to said cross frame members;
each of said frame members being generally channel-shaped and each having a front wall and an inner and outer sidewall projecting from said front wall, said walls together defining a primary channel therebetween, the outer sidewall of said first cross frame member defining first and second unthreaded apertures adjacent one end;
said first side frame member further having an intermediate wall projecting from said front wall between said inner and outer sidewalls for defining a secondary channel between said outer sidewall and said intermediate sidewall;
said first side frame member and said first cross frame member each having an end-abutting surface angled at substantially 45 degrees with respect to the length of each member and forming a miter joint therebetween;
a right angle corner member having a first leg and a second leg substantially perpendicular to said first leg, said first leg secured to the inner sidewall of said first cross frame member and said second leg disposed in said primary channel of said first side frame member adjacent the inner sidewall therein whereby outward movement of said first side frame member away from said first cross frame member is prevented;
a lug extending into said channel of said first side frame member from the inner sidewall, said lug defining a threaded aperture in alignment with said first unthreaded aperture of said first cross frame member;
a first screw disposed in said first unthreaded aperture of said first cross frame member with the screw head bearing against the outer sidewall thereof and with the first screw shank extending between the sidewalls of said first side frame member, said first screw being threadingly engaged in said threaded aperture of said lug extending from said inner sidewall of said first side frame member;
a hinge member disposed within said second unthreaded aperture, said hinge member having a non-circular element projecting from said outer sidewall of said first cross frame member and restrained in said door mounting frame against rotation relative thereto, said hinge member further having a cylindrical element projecting inwardly from said outer sidewall of said first cross frame member into said secondary channel of said first side frame member, said cylindrical portion having an annular channel at one end;
a deformation in said intermediate wall in a region adjacent said annular channel and projecting therein to prevent removal of said hinge member from said door;
a torsion bar extending from said cylindrical portion of said hinge member in said secondary channel; and
a second screw threadingly engaged in the outer wall of said first side frame member and projecting into said secondary channel for forcing a portion of said torsion bar against said intermediate wall for preventing rotation of said torsion bar at that point whereby said door is urged from an open position to a closed position by the torsion in said torsion bar.

* * * * *